(12) United States Patent
Zhou

(10) Patent No.: US 9,000,117 B2
(45) Date of Patent: Apr. 7, 2015

(54) SILICON-SULFUR POLYMER, SOLID ELECTROLYTE AND SOLID-STATE LITHIUM-ION BATTERY

(71) Applicant: Microvast New Materials (Huzhou) Co., Ltd., Huzhou, Zhejiang (CN)

(72) Inventor: Xiaoping Zhou, Zhejiang (CN)

(73) Assignee: Microvast Power Systems Co., Ltd., Xiangyi Industrial Park, Huzhou, Zhejiang (CN)

( * ) Notice: Subject to any disclaimer, the term of this patent is extended or adjusted under 35 U.S.C. 154(b) by 155 days.

(21) Appl. No.: 13/709,051

(22) Filed: Dec. 9, 2012

(65) Prior Publication Data

US 2014/0087271 A1  Mar. 27, 2014

(30) Foreign Application Priority Data

Sep. 24, 2012 (CN) .......................... 2012 1 0356928

(51) Int. Cl.
  *C08G 77/28* (2006.01)
  *H01M 10/0565* (2010.01)
  *H01M 10/0525* (2010.01)

(52) U.S. Cl.
  CPC ...... *H01M 10/0565* (2013.01); *H01M 10/0525* (2013.01); *Y02E 60/122* (2013.01)

(58) Field of Classification Search
  USPC ............ 528/25, 28, 29, 30; 556/426; 429/313
  See application file for complete search history.

(56) References Cited

U.S. PATENT DOCUMENTS

| | | | | |
|---|---|---|---|---|
| 2,590,039 | A | * | 3/1952 | Richter et al. ................ 556/426 |
| 3,085,104 | A | * | 4/1963 | Smith, Jr. et al. ............. 556/427 |
| 3,344,161 | A | * | 9/1967 | Moedritzer et al. .......... 556/426 |
| 3,511,862 | A | * | 5/1970 | Moedritzer ................... 556/426 |
| 3,792,126 | A | * | 2/1974 | Vio et al. ...................... 525/254 |
| 3,856,842 | A | * | 12/1974 | Nagai et al. .................. 556/426 |
| 4,299,974 | A | * | 11/1981 | Liu et al. ...................... 560/148 |
| 4,442,015 | A | * | 4/1984 | Packo et al. .................... 252/68 |
| 4,943,647 | A | * | 7/1990 | Band et al. .................... 556/426 |
| 5,039,419 | A | * | 8/1991 | Bradshaw et al. ......... 210/502.1 |
| 5,399,739 | A | * | 3/1995 | French et al. ................. 556/427 |
| 6,518,335 | B2 | * | 2/2003 | Reedy et al. .................... 524/82 |
| 7,179,560 | B2 | * | 2/2007 | Cho et al. ...................... 429/494 |

* cited by examiner

*Primary Examiner* — Margaret Moore
(74) *Attorney, Agent, or Firm* — Winston Hsu; Scott Margo

(57) ABSTRACT

The present disclosure discloses a silicon-sulfur polymer, a solid electrolyte comprising the silicon-sulfur polymer, and a corresponding solid-state lithium-ion battery. The silicon-sulfur polymer of the present disclosure is a polymer compound comprising both an inorganic backbone-chain structure and an organic side-chain structure, and has the characteristics of both the organic polymer and the inorganic polymer as well as many unique properties. Therefore, the solid electrolyte formed by the silicon-sulfur polymer and the solid-state lithium-ion battery thereof have many good characteristics including a good lithium-ion-conduction capability, better thermal endurance, a wider range of operating temperatures, and better thermostability.

20 Claims, 1 Drawing Sheet

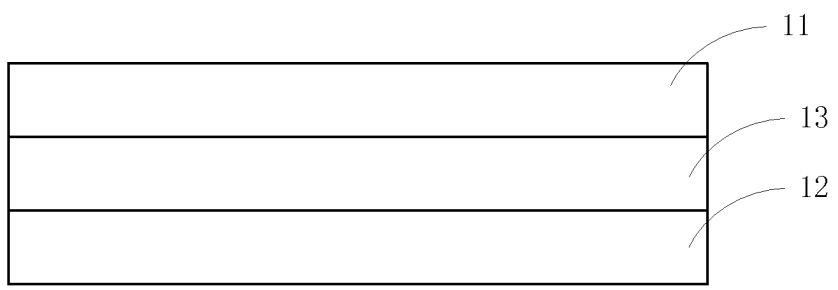

SILICON-SULFUR POLYMER, SOLID ELECTROLYTE AND SOLID-STATE LITHIUM-ION BATTERY

FIELD OF THE INVENTION

The present disclosure relates to a silicon-sulfur polymer, a preparation method thereof, and use of the silicon-sulfur polymer in a solid-state lithium-ion secondary battery.

BACKGROUND OF THE INVENTION

Conventional lithium-ion secondary batteries use a liquid electrolyte solution, which mainly comprises an organic solvent and a lithium salt. When such a lithium-ion secondary battery operates at a high rate, leakage of the electrolyte solution or even combustion or explosion of the battery is likely to happen because of the high operating temperature.

The solid-state polymer electrolyte is a kind of solid electrolyte material that has experienced rapid development in recent years. Because the solid-state polymer electrolyte comprises no liquid organic solvent, the shortcomings that the battery is prone to liquid leakage and that combustion and explosion may be caused when the operating temperature is too high are overcome. According to some researches, the solid-state polymer electrolyte can further effectively suppress growth of lithium dendrites in the charging process, thereby eliminating the risk of internal short-circuit faults that may be caused due to growth of the lithium dendrites. Furthermore, the solid electrolyte has the functions of both an electrolyte solution and a separator, and this eliminates the need of using the separator and also eliminates the need of protection which would be required by a liquid-electrolyte battery in an overcharged state. Therefore, this makes the battery relatively easier to be manufactured. The polymer electrolyte has advantages such as a light weight, good tenacity and good flexibility and is easy to be formed into a thin film, so it can further increase the energy density of the lithium-ion secondary battery.

The solid-state polymer electrolytes that have been developed may be mainly classified into all solid polymer electrolytes and gel polymer electrolytes. The existing all solid electrolytes are mainly solid materials formed by lithium salts (e.g., $LiClO_4$, $LiBF_4$, $LiAsF_6$, $LiPF_6$ etc.) dissolved in polyester (e.g., PEO or PPO) or polyether having a high molecular weight; and the gel polymer electrolytes are usually formed by adding a liquid plasticizer and/or a solvent into a polymer matrix to form a stable gel structure. However, no polymer electrolyte having a relatively high ionic conductivity within a relatively wide temperature range has been found yet, so increasing the conductivity of the polymer electrolyte at the room temperature has become a hot topic of research on the solid-state polymer electrolyte.

SUMMARY OF THE INVENTION

An objective of the present disclosure is to provide a silicon-sulfur polymer for a solid electrolyte.

The silicon-sulfur polymer of the present disclosure comprises at least one structure unit as shown by Formula 1 or Formula 2:

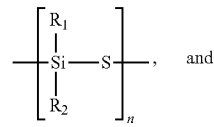

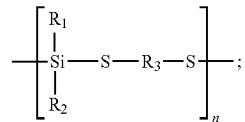

wherein $R_1$ and $R_2$ represent substituting groups which are respectively independently selected from alkyl, alkoxy, a polyether group and a terminal group with a —YA structure, at least one of the substituting groups $R_1$ and $R_2$ is the terminal group with the —YA structure, $R_3$ represents alkyl or aryl, n is an integer greater than 1, and in the terminal group with the —YA structure, Y represents an anion and A represents a cation.

According to an embodiment of the present disclosure, the anion Y is at least one selected from —S⁻,

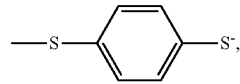

—N—$R_x$—O⁻, —O—$R_x$—NH⁻, —O—$R_x$—O⁻,

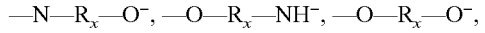

—S—$R_x$—S⁻,

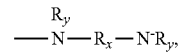

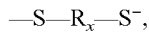

—N—$R_x$—S⁻, —S—$R_x$—NH⁻, —S—$R_x$—O⁻ and —O—$R_x$—S⁻, where $R_x$ and $R_y$ represent alkyl or aryl.

According to an embodiment of the present disclosure, the cation A is at least one selected from Li⁺, Na⁺, K⁺ and a quaternary ammonium cation, and is preferably Li⁺. Thus, cations, particularly lithium ions, are loaded at a high concentration into the solid electrolyte comprising the silicon-sulfur polymer, and this ensures that the material is capable of transmitting the cations, particularly the lithium ions, at a large throughput.

According to an embodiment of the present disclosure, at least one of the substituting groups $R_1$ and $R_2$ is —S⁻Li⁺. Preferably, the substituting group $R_1$ is alkyl, and the substituting group $R_2$ is —S⁻Li⁺. More preferably, the substituting group $R_1$ is methyl, and the substituting group $R_2$ is —S⁻Li⁺.

According to an embodiment of the present disclosure, the substituting group $R_1$ or $R_2$ comprises at least one crosslinking group which is formed by a crosslinking monomer having a polymerizing function, and the crosslinking monomer is at least one selected from H—S—H, HO—$R_x$—OH, HS—$R_x$—OH, HO—$R_x$—$NH_2$, $H_2N$—$R_x$—$NH_2$,

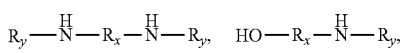

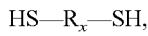

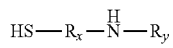

and HS—R$_x$—NH$_2$, where R$_x$ and R$_y$ represent alkyl or aryl. More preferably, the crosslinking monomer is at least one selected from H—S—H, HS—CH$_2$CH$_2$—SH, HO—CH$_2$CH$_2$—OH, HO—CH$_2$CH$_2$—SH, HO—CH$_2$CH$_2$—NH$_2$ and H$_2$N—CH$_2$CH$_2$—NH$_2$.

Another objective of the present disclosure is to provide a solid electrolyte comprising the aforesaid silicon-sulfur polymer.

Preferably, the solid electrolyte comprising the silicon-sulfur polymer of the present disclosure may further comprise an inorganic nanoparticle which is at least one selected from SiO$_2$, Li$_4$Ti$_5$O$_{12}$, TiO$_2$, Li$_3$PO$_4$, Al$_2$O$_3$ and lithium-containing zeolite. Adding the inorganic nanoparticle into the solid-state polymer electrolyte can further increase the conductivity of the electrolyte and, meanwhile, enhance the mechanical strength and improve the safety performance.

A further objective of the present disclosure is to provide a solid-state lithium-ion battery.

The solid-state lithium-ion battery comprises a cathode which comprises a cathode active material, an anode which comprises an anode active material, and the solid electrolyte as described above. The cathodeactive material may be at least one selected from lithium manganese oxide, lithium cobalt oxide, lithium nickel cobalt manganese oxide, lithium nickel cobalt aluminium oxide and lithium iron phosphate. The anodeactive material may be at least one selected from a carbon anodematerial, a lithium titanate anodematerial, a silicon anodematerial, a tin anodematerial and an alloy anodematerial. The carbon anodematerial is at least one selected from natural graphite, artificial graphite and meso-carbon microbeads (MCMBs).

Yet a further objective of the present disclosure is to provide a preparation method of the silicon-sulfur polymer. The silicon-sulfur polymer of the present disclosure is prepared through a reaction of a silicon-containing polymeric monomer, a sulfur-containing polymeric monomer and an alkoxide in a solvent.

According to an embodiment of the present disclosure, the silicon-containing polymeric monomer is at least one selected from LSi(OCH$_2$X)$_3$, L$_2$Si(OCH$_2$X)$_2$ and Si(OCH$_2$X)$_4$, where X represents methyl, ethyl, propyl, butyl or phenyl, L represents methyl, ethyl, propyl, phenyl, —SH,

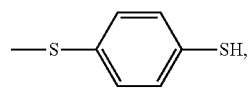

—N—R$_x$—OH, —O—R$_x$—OH, —S—R$_x$—SH,

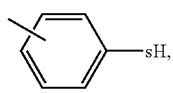

—N—R$_x$—SH, —S—R$_x$—NH$_2$, —S—R$_x$—OH or —O—R$_x$—SH, and R$_x$ represents alkyl or aryl.

According to an embodiment of the present disclosure, the silicon-containing polymeric monomer is preferably at least one selected from LSi(OCH$_3$)$_3$, L$_2$Si(OCH$_3$)$_2$ and Si(OCH$_3$)$_4$, where L represents methyl, ethyl, propyl, phenyl, —SH,

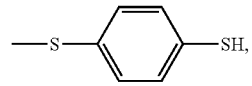

—N—R$_x$—OH, —O—R$_x$—OH, —S—R$_x$—SH,

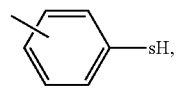

—N—R$_x$—SH, —S—R$_x$—NH$_2$, —S—R$_x$—OH or —O—R$_x$—SH, and R$_x$ represents alkyl or aryl. More preferably, the silicon-containing polymeric monomer is at least one selected from CH$_3$Si(OCH$_3$)$_3$ and (CH$_3$)$_2$Si(OCH$_3$)$_2$.

According to an embodiment of the present disclosure, the silicon-containing polymeric monomer is at least one selected from LSiCl$_3$, L$_2$SiCl$_2$ and SiCl$_4$, where L represents methyl, ethyl, propyl, phenyl, —SH,

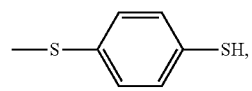

—N—R$_x$—OH, —O—R$_x$—OH, —S—R$_x$—SH,

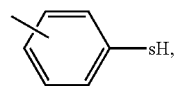

—N—R$_x$—SH, —S—R$_x$—NH$_2$, —S—R$_x$—OH or —O—R$_x$—SH, and R$_x$ represents alkyl or aryl. Preferably, the silicon-containing polymeric monomer is at least one selected from CH$_3$SiCl$_3$ and (CH$_3$)$_2$SiCl$_2$.

According to an embodiment of the present disclosure, the silicon-containing polymeric monomer further comprises a control monomer. The control monomer is a silicon-containing polymeric monomer in which one or two substituting groups on a silicon atom are alkyl. The control monomer is at least one selected from TSi(OCH$_3$)$_3$ and T$_2$Si(OCH$_3$)$_2$, where T represents methyl, ethyl, propyl, butyl or phenyl. Preferably, the control monomer is at least one selected from CH$_3$Si(OCH$_3$)$_3$ and (CH$_3$)$_2$Si(OCH$_3$)$_2$. The control monomer can be used to control the mechanical properties such as the mechanical strength and flexibility of the polymer.

According to an embodiment of the present disclosure, the sulfur-containing polymeric monomer is a compound having two functional groups. The sulfur-containing polymeric monomer of the present disclosure is at least one selected from H$_2$S and a compound having thiohydroxy, thiohydroxy and hydroxyl, or thiohydroxy and amido at both terminals of the molecule, and may be at least one selected from H—S—H, HS—R$_x$—OH, HS—R$_x$—SH,

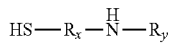

and HS—$R_x$—$NH_2$, where $R_x$ and $R_y$ represent alkyl or aryl. More preferably, the and sulfur-containing polymeric monomer is at least one selected from H—S—H, HS—$CH_2CH_2$—OH, HS—$CH_2CH_2$—SH,

and HS—$CH_2CH_2$—$NH_2$, where $R_y$ represents alkyl or aryl.

According to an embodiment of the present disclosure, the alkoxide is a compound produced from alcohols and the cation A, and is at least one selected from alkoxides having a structure of

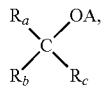

where $R_a$, $R_b$ and $R_c$ are selected from hydrogen (H), alkyl, alkylene and aryl, and A is selected from $Li^+$, $Na^+$, $K^+$ and a quaternary ammonium cation. More preferably, the alkoxide is at least one selected from a methoxide and an ethylate of $Li^+$, $Na^+$, $K^+$ or the quaternary ammonium cation.

According to an embodiment of the present disclosure, the solvent is at least one selected from alcohols having a structure of

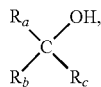

tetrahydrofuran, methyl ethyl ketone and acetone, where $R_a$, $R_b$ and $R_c$ are selected from hydrogen (H), alkyl, alkylene and aryl. Preferably, the solvent of the present disclosure is at least one selected from methanol, ethanol, n-propanol, isopropanol, n-butanol, 2-butanol, tert-butanol, benzyl alcohol, tetrahydrofuran and acetone.

According to an embodiment of the present disclosure, the silicon-sulfur polymer is prepared under protection of an inert gas, and the inert gas is selected from nitrogen, helium and argon.

The silicon-sulfur polymer of the present disclosure may be designed to have a chain structure, a ring structure or a reticular structure as needed, wherein the chain structure comprises a linear structure or a branched structure. When the silicon-sulfur polymer of the present disclosure is prepared without using a crosslinking monomer, the resulting silicon-sulfur polymer is a chain silicon-sulfur polymer. In the case of using a crosslinking monomer, molecular chains of the silicon-sulfur polymer are cross-linked by the crosslinking monomer to form the reticular structure or the ring structure, thereby increasing the rigidity of the polymer. The aforesaid crosslinking monomer has a structure of two functional groups, and may be at least one selected from H—S—H, HO—$R_x$—OH, HS—$R_x$—OH, HO—$R_x$—$NH_2$, $H_2N$—$R_x$—$NH_2$,

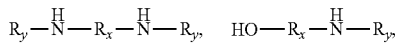

HS—$R_x$—SH,

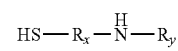

and HS—$R_x$—$NH_2$, where $R_x$ and $R_y$ represent alkyl or aryl.

The silicon-sulfur polymer of the present disclosure may be synthesized through a reaction of $LSi(OCH_3)_3$, $L_2Si(OCH_3)_2$, $Si(OCH_3)_4$ or a mixture thereof and a control monomer $TSi(OCH_3)_3$ and/or $T_2Si(OCH_3)_2$ added therein in a certain proportion with a sulfur-containing polymeric monomer and an alkoxide of $Li^+$, $Na^+$, $K^+$ or the quaternary ammonium cation, where L represents methyl, ethyl, propyl, phenyl, —SH,

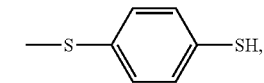

—N—$R_x$—OH, —O—$R_x$—OH, —S—$R_x$—SH,

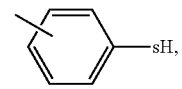

—N—$R_x$—SH, —S—$R_x$—$NH_2$, —S—$R_x$OH or —O—$R_x$—SH, $R_x$ represents alkyl or aryl, and T represents methyl, ethyl, propyl, butyl or phenyl.

According to an embodiment of the present disclosure, the silicon-sulfur polymer may be synthesized through a reaction of $LSi(OCH_2X)_3$, $L_2Si(OCH_2X)_2$, $Si(OCH_2X)_4$ or a mixture thereof and a control monomer $TSi(OCH_3)_3$ and/or $T_2Si(OCH_3)_2$ added therein in a certain proportion with a sulfur-containing polymeric monomer and an alkoxide of $Li^+$, $Na^+$, $K^+$ or the quaternary ammonium cation, where X represents methyl, ethyl, propyl, butyl or phenyl.

According to an embodiment of the present disclosure, the silicon-sulfur polymer may be synthesized by making $LSiCl_3$, $L_2SiCl_2$, $SiCl_4$ or a mixture thereof firstly react with a sulfur-containing polymeric monomer in a certain proportion for a period of time, with $N_2$ being used to expel HCl produced, and then react with an alkoxide of $Li^+$, $Na^+$, $K^+$ or the quaternary ammonium cation.

The silicon-sulfur polymer of the present disclosure is a polymer compound comprising both an inorganic backbone-chain structure and an organic side-chain structure, and has the characteristics of both the organic polymer and the inorganic polymer as well as many unique properties. The silicon-sulfur polymer has cation conductivity, a high ionic conductivity, a good film-forming performance, good thermostability and a wide range of operating temperatures, and is very suitable for use as a solid electrolyte of a solid-state lithium-ion battery. The silicon-sulfur polymer electrolyte of the present disclosure is a kind of new solid polymer electrolyte, and has better thermal endurance and a lower surface tension as compared to carbon-skeleton polymers such as polyesters or polyethers. Furthermore, the silicon-sulfur polymer electrolyte has at least one anion on each silicon atom and has counter cations at a high concentration in the molecules, so it has a good lithium-ion-conduction capability.

BRIEF DESCRIPTION OF THE DRAWINGS

FIGURE is a cross-sectional view of a solid-state lithium-ion battery according to an embodiment of the present disclosure.

DETAILED DESCRIPTION OF THE INVENTION

An objective of the present disclosure is to provide a silicon-sulfur polymer for a solid electrolyte.

The silicon-sulfur polymer of the present disclosure comprises at least one structure unit as shown by Formula 1 or Formula 2:

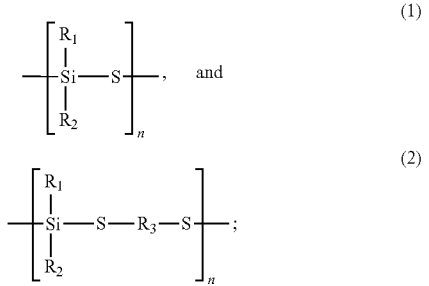

wherein $R_1$ and $R_2$ represent substituting groups which are respectively independently selected from alkyl, alkoxy, a polyether group and a terminal group with a —YA structure, at least one of the substituting groups $R_1$ and $R_2$ is the terminal group with the —YA structure, $R_3$ represents alkyl or aryl, n is an integer greater than 1, and in the terminal group with the —YA structure, Y represents an anion and A represents a cation.

According to an embodiment of the present disclosure, the anion Y is at least one selected from —S⁻,

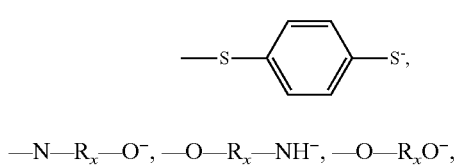

—N—$R_x$—O⁻, —O—$R_x$—NH⁻, —O—$R_x$O⁻,

—S—$R_x$—S⁻,

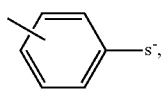

—N—$R_x$—S⁻, —S—$R_x$—NH⁻, —S—$R_x$—O⁻ and —O—$R_x$—S⁻, where $R_x$ and $R_y$ represent alkyl or aryl.

According to an embodiment of the present disclosure, the cation A is at least one selected from Li⁺, Na⁺, K⁺ and a quaternary ammonium cation, and is preferably Li⁺. Thus, cations, particularly lithium ions, are loaded at a high concentration into the solid electrolyte comprising the silicon-sulfur polymer, and this ensures that the material is capable of transmitting the cations, particularly the lithium ions, at a large throughput.

According to an embodiment of the present disclosure, at least one of the substituting groups $R_1$ and $R_2$ is —S⁻Li⁺. Preferably, the substituting group $R_1$ is alkyl, and the substituting group $R_2$ is —S⁻Li⁺. More preferably, the substituting group $R_1$ is methyl, and the substituting group $R_2$ is —S⁻Li⁺.

According to an embodiment of the present disclosure, the substituting group $R_1$ or $R_2$ comprises at least one crosslinking group which is formed by a crosslinking monomer having a polymerizing function, and the crosslinking monomer is at least one selected from H—S—H, HO—$R_x$—OH, HS—$R_x$—OH, HO—$R_x$—NH₂, H₂N—$R_x$—NH₂,

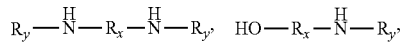

HS—$R_x$—SH,

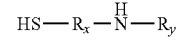

and HS—$R_x$—NH₂, where $R_x$ and $R_y$ represent alkyl or aryl. More preferably, the crosslinking monomer is at least one selected from H—S—H, HS—CH₂CH₂—SH, HO—CH₂CH₂—OH, HO—CH₂CH₂—SH, HO—CH₂CH₂—NH₂ and H₂N—CH₂CH₂—NH₂.

Another objective of the present disclosure is to provide a solid electrolyte comprising the aforesaid silicon-sulfur polymer. Preferably, the solid electrolyte comprising the silicon-sulfur polymer of the present disclosure may further comprise an inorganic nanoparticle which is at least one selected from SiO₂, Li₄Ti₅O₁₂, TiO₂, Li₃PO₄, Al₂O₃ and lithium-containing zeolite. Adding the inorganic nanoparticle into the solid-state polymer electrolyte can further increase the conductivity of the electrolyte and, meanwhile, enhance the mechanical strength and improve the safety performance.

A further objective of the present disclosure is to provide a solid-state lithium-ion battery. As shown in FIGURE, the solid-state lithium-ion battery comprises a cathode 11 which comprises a cathode active material, an anode 12 which comprises an anode active material, and the solid electrolyte 13 as described above. The cathode active material may be at least one selected from lithium manganese oxide, lithium cobalt oxide, lithium nickel cobalt manganese oxide, lithium nickel cobalt aluminium oxide and lithium iron phosphate. The anode active material may be at least one selected from a carbon anode material, a lithium titanate anode material, a silicon anode material, a tin anode material and an alloy anode material. The carbon anode material is at least one selected from natural graphite, artificial graphite and mesocarbon microbeads (MCMBs).

Yet a further objective of the present disclosure is to provide a preparation method of the silicon-sulfur polymer. The silicon-sulfur polymer of the present disclosure is prepared through a reaction of a silicon-containing polymeric monomer, a sulfur-containing polymeric monomer and an alkoxide in a solvent.

According to an embodiment of the present disclosure, the silicon-containing polymeric monomer is at least one selected from LSi(OCH₂X)₃, L₂Si(OCH₂X)₂ and Si(OCH$_2$X)$_4$, where X represents methyl, ethyl, propyl, butyl or phenyl, L represents methyl, ethyl, propyl, phenyl, —SH,

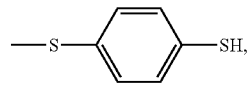

—N—R$_x$—OH, —O—R$_x$—OH, —S—R$_x$—SH,

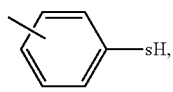

—N—R$_x$—SH, —S—R$_x$—NH$_2$, —S—R$_x$—OH or —O—R$_x$—SH, and R$_x$ represents alkyl or aryl.

According to an embodiment of the present disclosure, the silicon-containing polymeric monomer is preferably at least one selected from LSi(OCH$_3$)$_3$, L$_2$Si(OCH$_3$)$_2$ and Si(OCH$_3$)$_4$, where L represents methyl, ethyl, propyl, phenyl, —SH

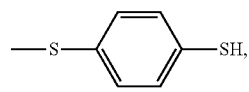

—N—R$_x$—OH, —O—R$_x$—OH, —S—R$_x$—SH,

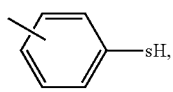

—N—R$_x$—SH, —S—R$_x$—NH$_2$, —S—R$_x$—OH or —O—R$_x$—SH, and R$_x$ represents alkyl or aryl. More preferably, the silicon-containing polymeric monomer is at least one selected from CH$_3$Si(OCH$_3$)$_3$ and (CH$_3$)$_2$Si(OCH$_3$)$_2$.

According to an embodiment of the present disclosure, the silicon-containing polymeric monomer is at least one selected from LSiCl$_3$, L$_2$SiCl$_2$ and SiCl$_4$, where L represents methyl, ethyl, propyl, phenyl, —SH,

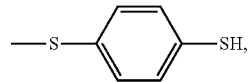

—N—R$_x$—OH, —O—R$_x$—OH, —S—R$_x$—SH,

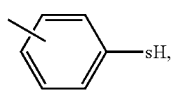

—N—R$_x$—SH, —S—R$_x$—NH$_2$, —S—R$_x$—OH or —O—R$_x$—SH, and R$_x$ represents alkyl or aryl. Preferably, the silicon-containing polymeric monomer is at least one selected from CH$_3$SiCl$_3$ and (CH$_3$)$_2$SiCl$_2$.

According to an embodiment of the present disclosure, the silicon-containing polymeric monomer further comprises a control monomer. The control monomer is a silicon-containing polymeric monomer in which one or two substituting groups on a silicon atom are alkyl. The control monomer is at least one selected from TSi(OCH$_3$)$_3$ and T$_2$Si(OCH$_3$)$_2$, where T represents methyl, ethyl, propyl, butyl or phenyl. Preferably, the control monomer is at least one selected from CH$_3$Si(OCH$_3$)$_3$ and (CH$_3$)$_2$Si(OCH$_3$)$_2$. The control monomer can be used to control the mechanical properties such as the mechanical strength and flexibility of the polymer.

According to an embodiment of the present disclosure, the sulfur-containing polymeric monomer is a compound having two functional groups. The sulfur-containing polymeric monomer of the present disclosure is at least one selected from H$_2$S and a compound having thiohydroxy, thiohydroxy and hydroxyl, or thiohydroxy and amido at both terminals of the molecule, and may be at least one selected from H—S—H, HS—R$_x$—OH, HS—R$_x$—SH,

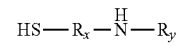

and HS—R$_x$—NH$_2$, where R$_x$ and R$_y$ represent alkyl or aryl. More preferably, the sulfur-containing polymeric monomer is at least one selected from H—S—H, HS—CH$_2$CH$_2$—OH, HS—CH$_2$CH$_2$—SH,

and HS—CH$_2$CH$_2$—NH$_2$, where R$_y$ represents alkyl or aryl.

According to an embodiment of the present disclosure, the alkoxide is a compound produced from alcohols and the cation A, and is at least one selected from alkoxides having a structure of

where R$_a$, R$_b$ and R$_c$ are selected from hydrogen (H), alkyl, alkylene and aryl, and A is selected from Li$^+$, Na$^+$, K$^+$ and a quaternary ammonium cation. More preferably, the alkoxide is at least one selected from a methoxide and an ethylate of Li$^+$, Na$^+$, K$^+$ or the quaternary ammonium cation.

According to an embodiment of the present disclosure, the solvent is at least one selected from alcohol having a structure of

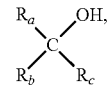

tetrahydrofuran, methyl ethyl ketone and acetone, where R$_a$, R$_b$ and R$_c$ are selected from hydrogen (H), alkyl, alkylene and aryl. Preferably, the solvent of the present disclosure is at least one selected from methanol, ethanol, n-propanol, isopropanol, n-butanol, 2-butanol, tert-butanol, benzyl alcohol, tetrahydrofuran and acetone.

According to an embodiment of the present disclosure, the silicon-sulfur polymer is prepared under protection of an inert gas, and the inert gas is selected from nitrogen, helium and argon.

The silicon-sulfur polymer of the present disclosure may be designed to have a chain structure, a ring structure or a reticular structure as needed, wherein the chain structure comprises a linear structure or a branched structure. When the silicon-sulfur polymer of the present disclosure is prepared without using a crosslinking monomer, the resulting silicon-sulfur polymer is a chain silicon-sulfur polymer. In the case of using a crosslinking monomer, molecular chains of the silicon-sulfur polymer are cross-linked by the crosslinking monomer to form the reticular structure or the ring structure, thereby increasing the rigidity of the polymer. The aforesaid crosslinking monomer has a structure of two functional groups, and may be at least one selected from H—S—H, HO—$R_x$—OH, HS—$R_x$—OH, HO—$R_x$—$NH_2$, $H_2N$—$R_x$—$NH_2$,

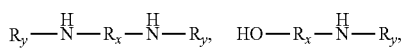

HS—$R_x$—SH,

and HS—$R_x$—$NH_2$, where $R_x$ and $R_y$ represent alkyl or aryl.

The silicon-sulfur polymer of the present disclosure may be synthesized through a reaction of $LSi(OCH_3)_3$, $L_2Si(OCH_3)_2$, $Si(OCH_3)_4$ or a mixture thereof and a control monomer $TSi(OCH_3)_3$ and/or $T_2Si(OCH_3)_2$ added therein in a certain proportion with a sulfur-containing polymeric monomer and an alkoxide of $Li^+$, $Na^+$, $K^+$ or the quaternary ammonium cation, where L represents methyl, ethyl, propyl, phenyl, —SH,

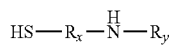

—N—$R_x$—OH, —O—$R_x$—OH, —S—$R_x$—SH,

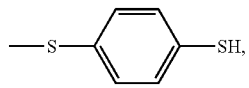

—N—$R_x$—SH, —S—$R_x$—$NH_2$, —S—$R_x$—OH or —O—$R_x$—SH, $R_x$ represents alkyl or aryl, and T represents methyl, ethyl, propyl, butyl or phenyl.

According to an embodiment of the present disclosure, the silicon-sulfur polymer may be synthesized through a reaction of $LSi(OCH_2X)_3$, $L_2Si(OCH_2X)_2$, $Si(OCH_2X)_4$ or a mixture thereof and a control monomer $TSi(OCH_3)_3$ and/or $T_2Si(OCH_3)_2$ added therein in a certain proportion with a sulfur-containing polymeric monomer and an alkoxide of $Li^+$, $Na^+$, $K^+$ or the quaternary ammonium cation, where X represents methyl, ethyl, propyl, butyl or phenyl.

According to an embodiment of the present disclosure, the silicon-sulfur polymer may be synthesized by making $LSiCl_3$, $L_2SiCl_2$, $SiCl_4$ or a mixture thereof firstly react with a sulfur-containing polymeric monomer in a certain proportion for a period of time, with $N_2$ being used to expel HCl produced, and then react with an alkoxide of $Li^+$, $Na^+$, $K^+$ or the quaternary ammonium cation.

According to an embodiment of the present disclosure, a preparation method of a silicon-sulfur polymer and a solid electrolyte comprising the silicon-sulfur polymer comprises the following steps. A solvent is added into a reactor protected by nitrogen. Then, a raw material $LSi(OCH_3)_3$, $L_2Si(OCH_3)_2$, $Si(OCH_3)_4$, or a mixture thereof is added into the solvent; and a control monomer such as $TSi(OCH_3)_3$ or $T_2Si(OCH_3)_2$ is added in a certain proportion to formulate a solution, where T represents methyl, ethyl, propyl, butyl or phenyl. The total mol number of Si added above is x. Then, an alkoxide of an alkali metal and/or an alkoxide of a quaternary ammonium cation is added into the solution; and a sulfur-containing polymeric monomer is further added into the aforesaid solution, which is then stirred to be uniform. The total mol number of the sulfur-containing polymeric monomer is y, which satisfies y:x=1:1~1:2. The sulfur-containing polymeric monomer is selected from $H_2S$,

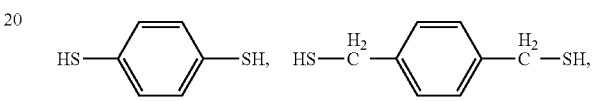

HS—$(CH_2)_m$—SH, $H_2N$—$(CH_2)_m$—SH, HS—$(CH_2)_m$—OH, HS—$R_x$—OH, $H_2N$—$R_x$SH,

HS—$R_x$S—H and a mixture thereof. The mixed solution is stirred and heated for polymerization reaction, with the reaction temperature generally ranging between 20 degrees and 200 degrees depending on specific reactants and the reaction duration being 1 to 24 hours. After the reaction is completed, a crosslinking monomer may be added to react for another 2 to 3 hours if it is desired to further increase the crosslinking degree. If it is desired to further adjust the performance of the electrolyte, an inorganic nanoparticle such as nano-$SiO_2$, $Li_4Ti_5O_{12}$, $TiO_2$, $Li_3PO_4$, $Al_2O_3$ and/or lithium-containing zeolite may further be added.

According to another embodiment of the present disclosure, a synthesis method of a silicon-sulfur polymer comprises the following steps. A solvent is added into a reactor protected by nitrogen. Then, a raw material $LSi(OCH_2X)_3$, $L_2Si(OCH_2X)_2$, $Si(OCH_2X)_4$, or a mixture thereof is added into the solvent, where X represents hydrogen, methyl, ethyl, propyl, butyl or phenyl; and a control monomer such as $TSi(OCH_3)_3$ or $T_2Si(OCH_3)_2$ is added in a certain proportion to formulate a solution, where T represents methyl, ethyl, propyl, butyl or phenyl. The total mol number of Si added above is x. Then, an alkoxide of an alkali metal and/or an alkoxide of a quaternary ammonium cation is added into the solution; and a sulfur-containing polymeric monomer is further added into the aforesaid solution, which is then stirred to be uniform. The total mol number of the sulfur-containing polymeric monomer is y, and the amount of the sulfur-containing polymeric monomer used satisfies y: x=1:1~1:2. The sulfur-containing polymeric monomer is selected from $H_2S$,

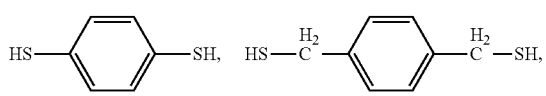

$HS-(CH_2)_m-SH$, $H_2N-(CH_2)_m-SH$, $HS-(CH_2)_m-OH$, $HS-R_x-OH$, $H_2N-R_x-SH$,

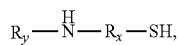

$H-S-R_xS-H$ and a mixture thereof. The mixed solution is stirred and heated for polymeric reaction, with the reaction temperature generally ranging between 20 degrees and 200 degrees depending on specific reactants and the reaction duration being 1 to 24 hours. After the reaction is completed, a crosslinking monomer may be added to react for another 2 to 3 hours if it is desired to further increase the crosslinking degree. If it is desired to further adjust the performance of the electrolyte, an inorganic nanoparticle such as nano-$SiO_2$, $Li_4Ti_5O_{12}$, $TiO_2$, $Li_3PO_4$, $Al_2O_3$ and/or lithium-containing zeolite may further be added.

According to another embodiment of the present disclosure, a synthesis method of a silicon-sulfur polymer comprises the following steps. A solvent is added into a reactor protected by nitrogen. Then, a raw material $LSiCl_3$, $L_2SiCl_2$, $SiCl_4$, or a mixture thereof is added into the solvent; and a control monomer such as $TSi(OCH_3)_3$ or $T_2Si(OCH_3)_2$ is added in a certain proportion to formulate a solution, where T represents methyl, ethyl, propyl, butyl or phenyl. The total mol number of Si added above is x. Next, a sulfur-containing polymeric monomer is added into the aforesaid solution, which is then stirred to be uniform. The total mol number of the sulfur-containing polymeric monomer is y, and the amount of the sulfur-containing polymeric monomer used satisfies y:x=1:1~1:2. The sulfur-containing polymeric monomer is selected from $H_2S$,

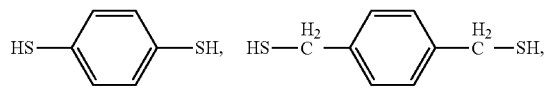

$HS-(CH_2)_m-SH$, $H_2N-(CH_2)_m-SH$, $HS(CH_2)_m-OH$, $HS-R_x-OH$, $H_2N-R_x-SH$,

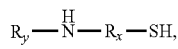

$H-S-R_xS-H$ and a mixture thereof. The mixed solution is stirred and heated for polymeric reaction, with the reaction temperature generally ranging between 20 degrees and 200 degrees depending on specific reactants. During the reaction, $N_2$ is bubbled into the solution to expel the HCl produced until no HCl is detected in the exhaust gas. The reaction duration takes 1 to 24 hours. Then, an alkoxide of an alkali metal and/or an alkoxide of a quaternary ammonium cation is added into the solution to react for another 1 to 4 hours. After the reaction is completed, a crosslinking monomer may be added to react for another 2 to 3 hours if it is desired to further increase the crosslinking degree. If it is desired to further adjust the performance of the electrolyte, an inorganic nanoparticle such as nano-$SiO_2$, $Li_4Ti_5O_{12}$, $TiO_2$, $Li_3PO_4$, $Al_2O_3$ and/or lithium-containing zeolite may further be added.

Example 1

Preparation of lithium methoxide: 0.200 mol of lithium metal was added into 200 ml of methanol to react completely to produce a lithium methoxide solution.

Synthesis of a silicon-sulfur-polymer solid electrolyte: $N_2$ was fed into a stirred tank reactor for the protection purpose, and 100 ml of methanol was added into the reactor as a solvent. 0.150 mol of $CH_3Si(OCH_3)_3$ and 0.050 mol of $(CH_3)_2Si(OCH_3)_2$ were weighed and added into the reactor. 0.010 mol of $(CH_3CH_2)_2Si(OCH_3)_2$ was added as a control monomer, and then the lithium methoxide solution was added. Then, 0.400 mol of $H_2S$ was fed into the reactor while being stirred. The mixed solution was stirred and heated to 80° C., and the reaction proceeded for 4 hours at this temperature to produce the silicon-sulfur-polymer solid electrolyte.

Example 2

Preparation of lithium methoxide: 0.200 mol of lithium metal was added into 200 ml of methanol to react completely to produce a lithium methoxide solution.

Synthesis of a silicon-sulfur-polymer solid electrolyte: $N_2$ was fed into a stirred tank reactor for the protection purpose, and 100 ml of methanol was added into the reactor as a solvent. 0.150 mol of $CH_3Si(OCH_3)_3$ and 0.050 mol of $(CH_3)_2Si(OCH_3)_2$ were weighed and added into the reactor. 0.020 mol of $CH_3CH_2Si(OCH_3)_3$ was added as a control monomer, and then the lithium methoxide solution was added. Then, 0.350 mol of $H_2S$ was fed into the reactor while being stirred. The mixed solution was stirred and heated to 80° C., and the reaction proceeded for 4 hours at this temperature. Then, 0.010 mol of glycol was added into the aforesaid slurry as a crosslinking monomer, and the reaction continued for 2 hours at 80° C. to produce the silicon-sulfur-polymer solid electrolyte.

Example 3

Preparation of lithium methoxide: 0.200 mol of lithium metal was added into 200 ml of methanol to react completely to produce a lithium methoxide solution.

Synthesis of a silicon-sulfur-polymer solid electrolyte: $N_2$ was fed into a stirred tank reactor for the protection purpose, and 100 ml of methanol was added into the reactor as a solvent. 0.150 mol of $CH_3Si(OCH_3)_3$ and 0.050 mol of $(CH_3)_2Si(OCH_3)_2$ were weighed and added into the reactor. 0.010 mol of $(CH_3CH_2)_2Si(OCH_3)_2$ was added as a control monomer, and then the lithium methoxide solution was added. Then, 0.300 mol of $H_2S$ was fed into the reactor while being stirred. The mixed solution was stirred and heated to 50° C., and the reaction proceeded for 4 hours at this temperature. Then, 0.020 mol of nano-$Li_4Ti_5O_{12}$ (less than 100 nanometers) was added into the aforesaid slurry, and a sand milling process was carried out for 2 hours at the room temperature to obtain the silicon-sulfur-polymer solid electrolyte.

Example 4

Preparation of lithium methoxide: 0.200 mol of lithium metal was added into 200 ml of methanol to react completely to produce a lithium methoxide solution.

Synthesis of a silicon-sulfur-polymer solid electrolyte: $N_2$ was fed into a stirred tank reactor for the protection purpose, and 100 ml of methanol was added into the reactor as a solvent. 0.150 mol of $CH_3Si(OCH_3)_3$ and 0.050 mol of $(CH_3)_2Si(OCH_3)_2$ were weighed and added into the reactor. Then, the lithium methoxide solution was added. Then, 0.400 mol of

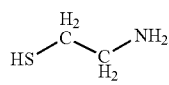

was added into the reactor while being stirred. The mixed solution was stirred and heated to 80° C., and the reaction proceeded for 4 hours at this temperature to produce the silicon-sulfur-polymer solid electrolyte.

Example 5

Preparation of lithium methoxide: 0.200 mol of lithium metal was added into 200 ml of methanol to react completely to produce a lithium methoxide solution.

Synthesis of a silicon-sulfur-polymer solid electrolyte: $N_2$ was fed into a stirred tank reactor for the protection purpose, and 250 ml of methanol was added into the reactor as a solvent. 0.150 mol of $CH_3SiCl_3$ and 0.050 mol of $(CH_3)_2SiCl_2$ were weighed and added into the reactor. Next, 0.350 mol of $HS-CH_2CH_2-SH$ was added into the aforesaid solution, which was then stirred to be uniform. $N_2$ was bubbled into the solution to expel the HCl produced, and the solution was stirred and heated to 50° C. to continue the reaction until no HCl was detected in the exhaust gas. Then, the lithium methoxide solution was added, and the resulting solution was stirred at 50° C. to react for 2 hours to produce the silicon-sulfur-polymer solid electrolyte.

Example 6

Preparation of lithium methoxide: 0.200 mol of lithium metal was added into 200 ml of methanol to react completely to produce a lithium methoxide solution.

Synthesis of a silicon-sulfur-polymer solid electrolyte: $N_2$ was fed into a stirred tank reactor for the protection purpose, and 250 ml of methanol was added into the reactor as a solvent. 0.150 mol of $CH_3SiCl_3$ and 0.050 mol of $(CH_3)_2SiCl_2$ were weighed and added into the reactor. Next, 0.300 mol of $HS-CH_2CH_2-SH$ was added into the aforesaid solution, which was then stirred to be uniform. $N_2$ was bubbled into the solution to expel the HCl produced, and the solution was stirred and heated to 50° C. to continue the reaction until no HCl was detected in the exhaust gas. Then, the lithium methoxide solution was added, and the resulting solution was stirred at 50° C. to react for 2 hours. Then, 0.030 mol of nano-$Li_4Ti_5O_{12}$ (less than 100 nanometers) was added into the aforesaid slurry, and a sand milling process was carried out for 2 hours at the room temperature to obtain the silicon-sulfur-polymer solid electrolyte.

What is claimed is:

1. A silicon-sulfur polymer for a solid electrolyte, comprising at least one structure unit as shown by Formula 1 or Formula 2:

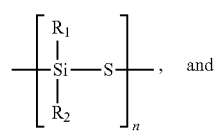 (1)

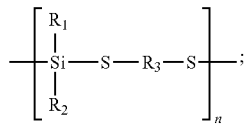 (2)

wherein $R_1$ and $R_2$ represent substituting groups which are respectively independently selected from alkyl, alkoxy, a polyether group and a terminal group with a —YA structure, at least one of the substituting groups $R_1$ and $R_2$ is the terminal group with the —YA structure, $R_3$ represents alkyl or aryl, n is an integer greater than 1, and in the terminal group with the —YA structure, Y represents an anion and A represents a cation.

2. The silicon-sulfur polymer of claim 1, wherein the anion Y is at least one selected from —S⁻,

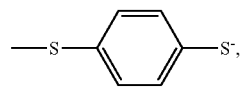

—N—$R_x$—O⁻, —O—$R_x$—NH⁻, —O—$R_x$—O⁻,

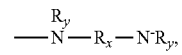

—S—$R_x$—S⁻,

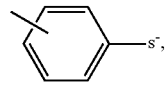

—N—$R_x$—S⁻, —S—$R_x$—NH⁻, —S—$R_x$—O⁻ and —O—$R_x$—S⁻, where $R_x$ and $R_y$ represent alkyl or aryl.

3. The silicon-sulfur polymer of claim 1, wherein the cation A is at least one selected from Li⁺, Na⁺, K⁺ and a quaternary ammonium cation.

4. The silicon-sulfur polymer of claim 1, wherein at least one of the substituting groups $R_1$ and $R_2$ is —S⁻Li⁺.

5. The silicon-sulfur polymer of claim 1, wherein the substituting group $R_1$ or $R_2$ comprises at least one crosslinking group which is formed by a crosslinking monomer having a polymerizing function, and the crosslinking monomer is at least one selected from H—S—H, HO—$R_x$—OH, HS—$R_x$—OH, HO—$R_x$—$NH_2$, $H_2N$—$R_x$—$NH_2$,

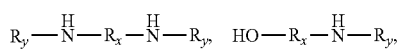

HS—$R_x$—SH,

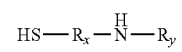

and HS—$R_x$—$NH_2$, where $R_x$ and $R_y$ represent alkyl or aryl.

6. A solid electrolyte, comprising the silicon-sulfur polymer of claim 1.

7. A solid-state lithium-ion battery, comprising a cathode which comprises a cathode active material, an anode which comprises an anode active material, and the solid electrolyte of claim 6.

8. A preparation method of the silicon-sulfur polymer, wherein the silicon-sulfur polymer is prepared through a reaction of a silicon-containing polymeric monomer, a sulfur-containing polymeric monomer and an alkoxide in a solvent; the silicon-sulfur polymer comprises at least one structure unit as shown by Formula (1) or Formula (2):

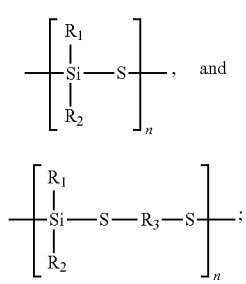

wherein $R_1$ and $R_2$ represent substituting groups which are respectively independently selected from alkyl, alkoxy, a polyether group and a terminal group with a —YA structure at least one of the substituting groups $R_1$ and $R_2$ is the terminal group with the —YA structure, $R_3$ represents alkyl or aryl, n is an integer greater than 1, and in the terminal group with the —YA structure, Y represents an anion and A represents a cation.

9. The preparation method of the silicon-sulfur polymer of claim 8, wherein the silicon-containing polymeric monomer is at least one selected from $LSi(OCH_2X)_3$, $L_2Si(OCH_2X)_2$ and $Si(OCH_2X)_4$, where X represents methyl, ethyl, propyl, butyl or phenyl, L represents methyl, ethyl, propyl, phenyl, —SH,

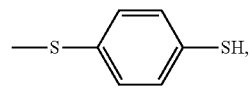

—N—$R_x$—OH, —O—$R_x$—OH, —S—$R_x$—SH,

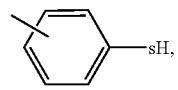

—N—$R_x$—SH, —S—$R_x$—NH$_2$, —S—$R_x$—OH, or —O—$R_x$—SH, and $R_x$ represent alkyl or aryl.

10. The preparation method of the silicon-sulfur polymer of claim 9, wherein the silicon-containing polymeric monomer is at least one selected from $LSi(OCH_3)_3$, $L_2Si(OCH_3)_2$ and $Si(OCH_3)_4$.

11. The preparation method of the silicon-sulfur polymer of claim 10, wherein the silicon-containing polymeric monomer is at least one selected from $CH_3Si(OCH_3)_3$ and $(CH_3)_2Si(OCH_3)_2$.

12. The preparation method of the silicon-sulfur polymer of claim 8, wherein the silicon-containing polymeric monomer is at least one selected from $LSiCl_3$, $L_2SiCl_2$ and $SiCl_4$, where L represents methyl, ethyl, propyl, phenyl, —SH,

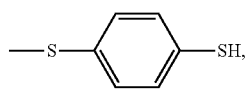

—N—$R_x$—OH, —N—$R_x$—OH, —S—$R_x$—SH,

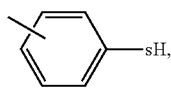

—N—$R_x$—SH, —S—$R_x$—NH$_2$, —S—$R_x$—OH or —O—$R_x$—SH, and $R_x$ represent alkyl or aryl.

13. The preparation method of the silicon-sulfur polymer of claim 12, wherein the silicon-containing polymeric monomer is at least one selected from $CH_3SiCl_3$ and $(CH_3)_2SiCl_2$.

14. The preparation method of the silicon-sulfur polymer of claim 8, wherein the silicon-containing polymeric monomer further comprises a control monomer which is at least one selected from $TSi(OCH_3)_3$ and $T_2Si(OCH_3)_2$, where T represents methyl, ethyl, propyl, butyl or phenyl.

15. The preparation method of the silicon-sulfur polymer of claim 14, wherein the control monomer is at least one selected from $CH_3Si(OCH_3)_3$ and $(CH_3)_2Si(OCH_3)_2$.

16. The preparation method of the silicon-sulfur polymer of claim 8, wherein the sulfur-containing polymeric monomer is at least one selected from $H_2S$ and a compound having thiohydroxy, thiohydroxy and hydroxyl, or thiohydroxy and amido at both terminals of a molecule thereof.

17. The preparation method of the silicon-sulfur polymer of claim 16, wherein the sulfur-containing polymeric monomer is at least one selected from —H—S—H, —HS—$R_x$—OH, —HS—$R_x$—SH,

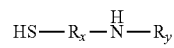

and —HS—$R_x$—NH$_2$, where $R_x$ and $R_y$ represent alkyl or aryl.

18. The preparation method of the silicon-sulfur polymer of claim 17, wherein the sulfur-containing polymeric monomer is at least one selected from H—S—H, HS—$CH_2CH_2$—OH, HS—$CH_2CH_2$—SH,

and HS—$CH_2CH_2$—NH$_2$.

19. The preparation method of the silicon-sulfur polymer of claim 8, wherein the alkoxide is at least one selected from alkoxides having a structure of

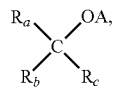

where $R_a$, $R_b$ and $R_c$ are selected from hydrogen, alkyl, alkylene and aryl, and A is selected from Li$^+$, Na$^+$, K$^+$ and a quaternary ammonium cation.

20. The preparation method of the silicon-sulfur polymer of claim 19, wherein the alkoxide is at least one selected from a methoxide and an ethylate of $Li^+$, $Na^+$, $K^+$ or the quaternary ammonium cation.

* * * * *